May 16, 1950

C. S. HAZARD 2,508,064

REGISTER CONTROLLED AUTO-STOP VALVE

Filed March 19, 1945

INVENTOR.
Charles S. Hazard
BY
George H. Corey
ATTORNEY

Patented May 16, 1950

2,508,064

UNITED STATES PATENT OFFICE 2,508,064

REGISTER CONTROLLED AUTO-STOP VALVE

Charles S. Hazard, Andover, N. J., assignor to Neptune Meter Company, a corporation of New Jersey Application March 19, 1945, Serial No. 583,429

10 Claims. (Cl. 235—132)

This invention relates to fluid control valves and more especially to fluid control valves which are biased to the closed position to stop flow of the fluid.

In valves of this type, it is desirable for many purposes, for example in the dispensing of a fluid such as gasoline or in controlling flow of other liquids, to deliver the fluid under the control of the valve at a relatively high rate during the major portion of the time of flow necessary to deliver a desired quantity. As the delivery approaches completion, it is then desirable to reduce the rate of flow in order that accurate measurement of the fluid delivered may be more easily accomplished. This result, in many instances, is attained by hand operation of an ordinary valve, first to reduce and then to stop flow, but experience shows that such hand operation is unreliable because of carelessness or lack of attention, or the inability of the operator to watch the meter and quickly operate the valve to closed position precisely on completion of the amount to be delivered. In many cases, it is desirable or necessary, therefore, that exact measurement of the fluid dispensed or controlled be secured by automatically effecting closure of the valve and precise cut-off of the flow at the instant of completing the desired measurement.

It is an object of the invention to provide means which may be combined with a valve of ordinary construction and which is operable to effect closing movement of the valve, this means being constructed so that, if desired, it may be operated upon the occurrence of a predetermined condition which, for example, may be a condition related to the fluid flow.

It is a further object of the invention to provide means which may be combined with a valve of ordinary construction to produce such closing movement of the valve, if desired, upon the occurrence of such a predetermined condition, and which is thereafter operable to interrupt said movement to maintain said valve partially open.

It is a still further object of the invention to provide a valve structure in which means are provided to restrain said valve in open position during normal flow which is operable to effect initial closing movement of the valve to a partly open position upon the occurrence of a predetermined condition and thereafter, upon the occurrence of a second predetermined condition, is operable to effect full closure of the valve.

It is also an object of the invention to provide in combination with the devices of the invention above referred to, means for opening the valve by hand which thereafter, upon the occurrence of one or both of said predetermined conditions, may be effective automatically to operate the valve for said closing movement or movements thereof.

It is a particular object of the invention to provide devices functioning as above mentioned in combination with a fluid control valve which may be controlled by a register of auto-stop type or other control means so that, upon completion of registration of a predetermined number of units, partial closure of the valve may be effected and, upon return of the auto-stop register to zero, full closure of the valve may be secured to complete the delivery of the quantity of fluid represented by said predetermined number of units.

The invention in certain of its aspects may be applied to a valve structure in which the opening and closing movement of the valve is effected by rotational movement of a stem or shaft. It also is applicable to valves of the type in which the opening and closing movement of the valve is effected by lengthwise movement of a stem to which the valve is operatively connected and the invention will be described in connection with such a valve as the preferred embodiment.

It is a feature of the invention that there are provided two significant operating parts, which will be referred to as a member M and a body B, which are supported to be movable relative to each other and each of which is provided with a cam surface which is arranged operatively to engage a common cam follower. Relative movement of the member and the body is produced by means associated therewith in order to effect movement of the follower along the cam surfaces. The cam follower is operatively connected to the valve and the requisite movement thereof to produce opening and closing movement of the valve is secured as said follower is moved along both said cam surfaces in one direction or the other under the camming action of said cooperating surfaces.

It is an important feature of the invention that one of said parts, for example, the member M, is arranged to be restrained in a position corresponding to the open position of the valve by restraining means which is actuatable, after said member takes its restrained position, to release said member, thereby to produce camming action on the cam follower to effect closing movement of the valve. The body B is arranged to be movable relative to said member M when so restrained so as to produce the camming action on said cam follower above referred to, in order to effect the opening movement of the valve. Means are provided for holding said body B in the position corresponding to the open position of the valve. In a valve structure which is provided with means to bias the valve to its closed movement, both said member M so restrained and said body B so held thus are maintained in their respective positions corresponding to the open position of the valve against the bias of said bias means. Release of said member M, as above indicated, enables the bias means to produce the closing movement of the valve as well as the camming action which is effective to move the member M reversely relative to the body B which is still held by its holding means.

The means for restraining the member M above referred to also may be constructed to intercept this reverse movement of the member relative to the body B, thus to interrupt the movement of the valve toward its closed position and so as to hold this valve in partially open position.

The invention will be described in connection with the drawings relating to an embodiment thereof in a valve of the so-called "globe" type in which the valve is operatively connected to a valve stem moving lengthwise of itself through a stuffing box, the valve seat lying in a plane perpendicular to the length of the stem. In the drawings.

Figure 1:
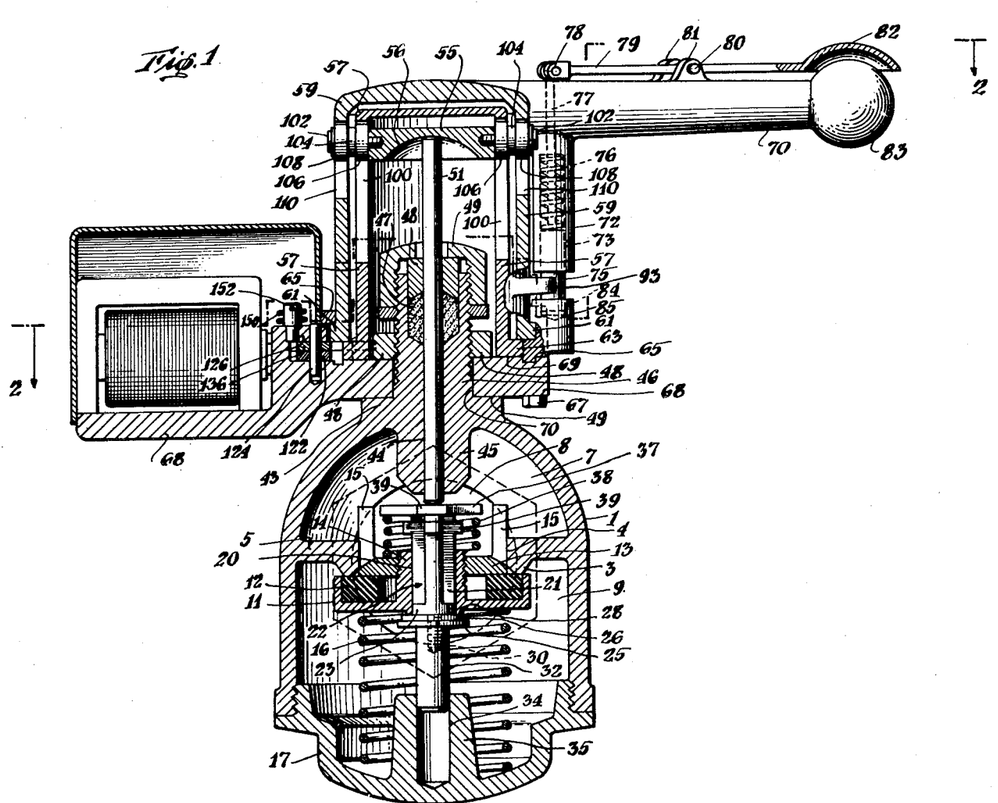
Fig. 1 is a vertical section of a valve embodying the invention.

In Fig. 1 within the body 1 of a valve of conventional "globe" type the valve seat 3 surrounding the valve opening 4 is formed in the transverse wall 5 which separates the space within the valve body into the passage 7 leading to the port 8. The valve will ordinarily be arranged in the pipe so that the port 8 is the outlet of the valve. The inlet, not shown in Fig. 1, communicates in the usual manner with the passage 9 so that the pressure under which the fluid is delivered is brought upon the valve disc 11 and tends to hold the valve closed. The disc 11 is provided with a hard rubber washer 12 for seating against the seat 3. The washer 12 is held in place in the disc 11 by lock-nut 13 threaded on the hub 14 of the valve disc 11. The lock-nut 13 is provided with a plurality of guide legs 15 extending parallel to the valve axis which slidably fit to the bore of the valve opening 4. The valve disc 11 is biased to closed position against the seat 3 by helical spring 16 bearing against the valve bonnet 17.

The hub 14 of the disc is provided with a cylindrical bore 20 to which is fitted a sliding spider 22 provided with a plurality of circumferentially spaced vertical ribs or legs 21 which bear on the inner surface of the cylindrical bore 20. This spider may be formed at its lower end with a cylindrical head 23 which fits to the bore 20 when the spider is in its uppermost position. In this position a valve disc 25 provided with a washer 26 seats upon the annular valve seat 28 formed as part of the valve disc 11 on the underside thereof and extending about the bore 20. The spider 22 may be provided with a stud extension 30 threaded into a spindle 32 to which the valve disc 25 is attached. The spindle 32 is fitted to slide in the bore 34 of a hub 35 formed as part of the bonnet 17 so as to guide the valve 25 to and from its seating position on the seat 28.

Attached to the upper end of the spider 22 to move therewith is a retainer 37 provided with a plurality of spaced prongs. This retainer serves to hold a helical compression spring 38 under compression against the lock-nut 13 so as to bias the valve 25 to closed position against the annular seat 28. Under this bias the spider 22 and the head 23 slide upwardly in the bore 20. To limit downward sliding movement of the spider 22 and head 23 and, therefore, the opening of the valve 25, the spider legs 21 are provided with lugs 39 so positioned thereon that the valve 25 may be moved off the seat 28 until the lower end of the lugs 39 reaches the upper end of the hub 14 of the valve disc 11. It will be apparent that such movement of the valve 25 from its seat 28 will produce opening of the passageway 9 to the space between the legs 21 of the spider 22 when the cylindrical head 23 has been moved downwardly beyond the seat 28. The position of the lugs 39 is such as to permit sufficient movement of the head 23 beyond the seat 28 to produce an area of valve opening for flow of the fluid therethrough and through the bore 20 into the passage 7 at a substantial but preferably at a limited rate.

Valve stem 51 is slidably arranged in the bore 44 of the hub extensions 45 and 46 formed on the upper portion of the valve body 1. The stem also extends through a stuffing box of conventional type comprising packing 47, gland 48 and nut 49 threaded on hub 46. Movement of the stem 51 lengthwise thereof may occur concomitantly with movement of the spider 22 and of the valve 25 to and from its seat 28. Movement of this stem also may be concomitant with movement of the valve 11 to and from its seat 3 when the lugs 39 are in contact with the hub 14 of the valve disc 11, the spider 22 and the pronged retainer 37, and the valve 11 then moving together. It will be apparent that when the valve stem 51, the lower end of which is in contact with the upper face of the pronged retainer 37, is forced downwardly this retainer and the spider 22 are moved downwardly against the bias of the compression spring 38 until the lugs 39 come into contact with the hub 14. This forces the valve 25 from its seat. Further downward pressure by the stem 51 then forces the valve disc 11 from its seat 3 against the bias of the spring 16. When the downward pressure of the valve stem 51 is removed the valve disc 11 is first moved upwardly by the spring 16 until its washer 12 is brought into contact with the seat 3. Thereafter the spring 38 acting against the pronged retainer 37 moves the spider 22 and valve 25 upwardly until the washer 26 of valve 25 comes in contact with the seat 28. It will be apparent, therefore, that such endwise movement of the valve stem 51 in the closing operation of the valve first produces a substantial reduction in the flow of the fluid by closing off the main valve opening 4 but maintains the small valve 25 open to provide a reduced area of flow, thereby limiting the flow of the fluid to the extent which may be determined by the position of the lugs 39 in relation to the hub 14 and in relation to the valve 25 and its washer 26, as well as to the length of the head 23.

In the particular embodiment of the invention illustrated in the drawing, for the purpose of effecting lengthwise movement of the stem 51, in contact with the upper end of said stem is a cylindrical disc 55 slidably fitted to the inner surface of a cylindrical shell 57 which may be closed at the upper end and is arranged concentric with the axis of the stem 51 and of the valve. Surrounding the shell 57 and concentric therewith is the shell 59 which may be closed at its upper end and which at its lower end is formed with a flange 61 extending about the circumference of said shell. The lower end of said shell 59 is machined to fit to and bear upon the upper machined face of a similar flange 63 of the shell 57. A retaining ring 65 extends about the flange 61 and bears upon the upper face of said flange 61 to retain the shell 59 in place, the shell 59 in turn serving to retain the shell 57 in place. The ring 65 may be suitably fitted to and fastened by means of bolts 67 to a bracket 68 fitted to the turned portion 70 of hub 46 so that the bracket 68 may be swung ito different positions angularly about the axis of the valve and of valve stem 51. The bracket 68 may be clamped in place by means of nut 48 threaded upon the hub extension 46. The lower face of the bracket 46 bears against the surface 49 turned on the hub 43 provided on the body 1. Although the bracket 68 may be clamped tight in position and the ring 65 is fixed thereto, the shells 57 and 59 are so fitted respectively to the upper surface 69 of the bracket 68 and to the upper surface of the flange 63 as well as to the ring 65 that these shells may be rotated upon their common axis relative to the valve and its valve stem as well as relative to each other.

Attached to or formed as part of the shell 59 is the laterally extending handle 70 provided with downwardly extending hub 72 which carries in its bore 73 the detent 75 slidable in said bore 73. Connected to the detent 75 is the rod 77, shown in dotted outline, which is connected at its upper end by means of pin 78 to the lever 79 pivoted on pin 80 held in brackets 81 formed on the arm 70. The lever 79 extends beyond the brackets 81 toward the right to an endpiece 82 conveniently related to the handle 83 at the end of the arm 70. Pressure downwardly upon the endpiece 82 moves the detent 75 upwardly in the bore 73 against the bias of the spring 76 within the hub 72. This upward movement lifts the detent from the position shown in Fig. 1 out of engagement with socket 84 in the hub 85 formed on the ring 65. While continuing the pressure on the endpiece 82 and holding handle 83, the outer shell 59 may be rotated by hand on its axis, the arm 70 moving in angular relation to the valve about the axis thereof, as may be understood from Fig. 2.

Figures 2, 3, 4, 5:
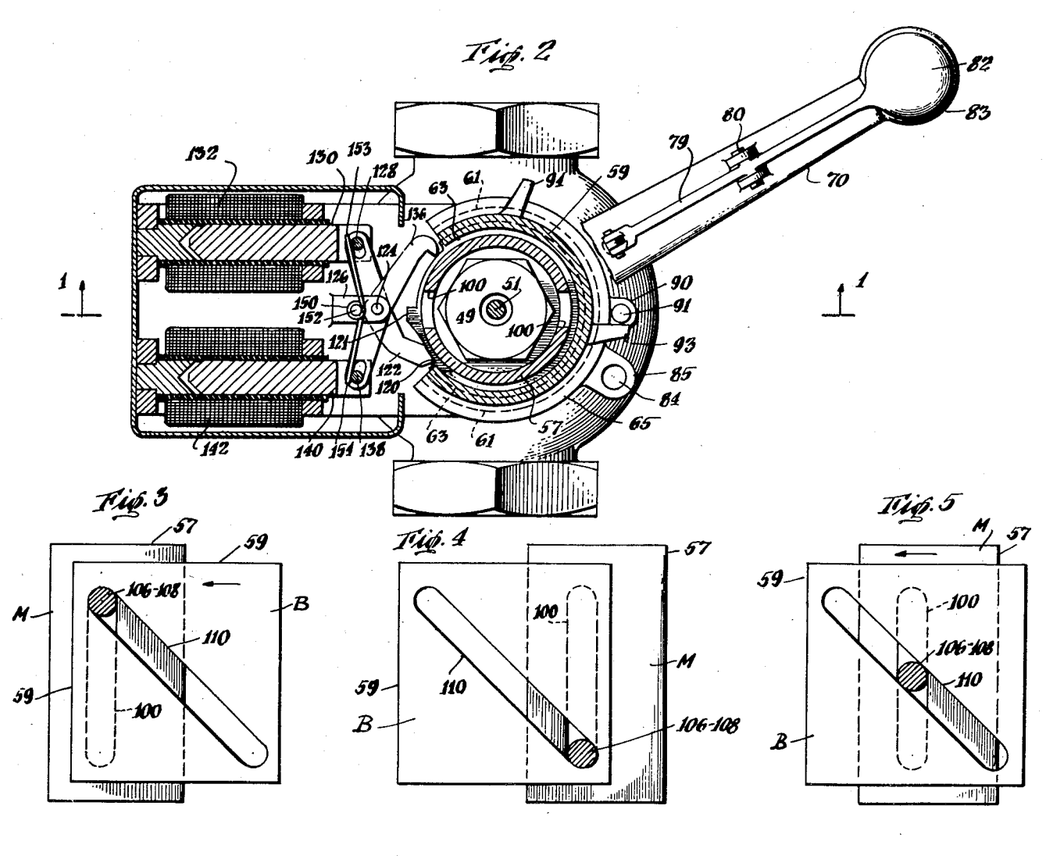
Fig. 2 is a horizontal section on line 2—2 of Fig. 1.
Figs. 3, 4 and 5 are diagrammatic illustrations showing the operative relation of the member and body carrying the camming surfaces.

The ring 65 is provided with a boss 90 in which is fastened pin 91 as shown in Fig. 2. The shell 59 is provided with lugs 93 and 94 which engage pin 91 to limit the rotational movement of the shell 59 as well as the angular movement of the arm 70. When the endpiece 82 has been pressed in order to lift the detent 75 as above described, the arm 70 may be swung into the position shown in Fig. 2 with the lug 93 against the pin 91. By swinging the arm 70 in the clockwise direction, that is, downwardly on the sheet in Fig. 2, the lug 94 is brought into engagement with the pin 91. In the arrangement illustrated in Fig. 2 this angular movement of arm 70 is about 60°. When the lug 94 is in engagement with the pin 91, the detent 75 may be dropped into the socket 84 in the hub 85 by releasing the lever 79, the spring 76 forcing the detent into said socket. The outer shell 59 then is held in the position to which it has thus been moved concomitantly with the angular movement of arm 70.

In the wall of shell 57 are formed grooves 100 at opposite sides of the axis of the shell, extending parallel to said axis. Mounted on studs 102 threaded in the periphery of disc 55 at opposite sides of the axis are two sets of rollers 106 and 108 separated by washers 104. The rollers and studs are so arranged that the rollers 106 engage the grooves 100 and may move lengthwise along said grooves when the disc 55 moves in the direction parallel to the axis of the valve. Such movement of the disc 55 will occur concomitantly with lengthwise movement of the valve stem 51. Such lengthwise movement of the rollers 106 along grooves 100 may occur either when the shell 57 is stationary or when it is in rotational movement, as will be hereafter explained. In the latter case, however, since the rollers 106 are within the grooves 100, the disc 55 and the rollers rotate with the shell 57, the disc 55 being provided with the concave surface 56 engaged by the upper end of valve stem 51 which permits the disc 55 to rotate relative to the valve stem 51 on the axis thereof. It will be apparent that the disc 55 is biased to the upper end of the shell 57 by the springs 16 and 38 acting through the parts above described and through the valve stem 51.

In the wall of the outer shell 59 are formed grooves 110 at opposite sides of the axis of the shell the surfaces of which engage the rollers 108. In the particular embodiment being described these grooves 110 extend helically in the cylindrical wall constituted by the shell 59. These helical grooves have an extent, therefore, along the length of the shell parallel to the axis thereof and have, as well, an extent circumferentially of the shell 59. The extent lengthwise of the axis is substantially the same as the length of the grooves 100 in shell 57.

The action of the two cam surfaces provided by the grooves 100 and 110 in engagement respectively with the rollers 106 and 108 will be better understood from consideration of Figs. 3, 4 and 5. These figures show in diagrammatic form the three positions of the "member" M, corresponding to the shell 57, and the "body" B, corresponding to the shell 59, as above referred to. The shell 57 or member M is represented by the rectangle so identified, the groove 100 being shown in dotted outline. In the outer shell 59 or body B, represented by rectangle 59, overlapping the member M is formed the inclined groove 110. The member M and the body B thus constitute in Figs. 3, 4 and 5 developed portions of the shells 57 and 59 and their grooves 100 and 110 of Figs. 1 and 2. The groove 110 extends at at angle of 45° to the horizontal and to the vertical. Camming action produced by movement of the body B relative to the member M thus may be secured with full advantage in either direction of said relative movement. The cross-sectioned circle identified in Figs. 3, 4 and 5 with the numerals 106—108 represents diagrammatically rollers 106 and 108.

Fig. 3 represents the position of the two shells when the valve is closed, the rollers 106 and 108, therefore, being in the upper extremity of both grooves 100 and 110. Assuming that the handle 70 is in the position with the detent 75 engaging the socket 84 in the hub 85 and the valve is closed, pressure on the endpiece 82 of lever 79 will lift the detent 75 from the socket and the arm 70 may be moved to the position shown in Fig. 2. In such angular movement of the arm 70 both the shells 57 and 59 are rotated therewith through the same angle, the disc 55 rotating on the end of the valve stem 51. Restraining means hereinafter to be described then engages the shell 57 to hold it in the position to which it has been moved. The relation of the two shells, that is of the member M and body B to each other, and therefore of the rollers thereto remains that illustrated in Fig. 3 during this movement.

After the shell 57 has reached the position in which it is restrained, the arm 70 may be moved clockwise through the angle of 60° from the position in which it is shown in Fig. 2 and the detent 75 may be dropped into the socket 84 by release of the lever 79. In such movement of the arm 70 which corresponds to movement of the body B in the direction of the arrow shown in Fig. 3, the member M being stationary, the body B is moved to the position shown in Fig. 4. Camming action occurs between the groove 110 and the rollers represented by the circle 106—108 which are moved to the position at the bottom of both grooves, as shown in Fig. 4. It will be apparent that this downward movement of the circle 106—108 corresponds to opening movement of the valve as above described in connection with Fig. 1. When, in the manner hereinafter to be described, the inner shell 57 is released for rotational movement, the rollers represented by the circle 106—108 may again move vertically, these rollers being biased upwardly as above stated, the circle 106—108 moving along the incline of groove 110 in the body B. Since the outer shell 59, that is the body B in Fig. 4, is held against movement, upward movement of the rollers represented by the circle 106—108 occurs only upon rotational movement of the inner shell 57 represented by movement of the member M in the direction of the arrow as shown in Fig. 5. This figure may be taken as representing the relation of the shells 57 and 59 at a typical moment in the movement of the inner shell 57 in the clockwise direction, that is in the direction reverse to that in which it was moved by swinging the arm 70 to the position shown in Fig. 2.

In order to restrain the inner shell 57 after it has been rotated, counter-clockwise in Fig. 2, together with the outer shell 59 prior to opening the valve, the flange 63 of the inner shell 57 may be provided as shown in Fig. 2 with a ratchet tooth 120 engaged by pawl 122 supported pivotally on fixed pin 124 held in bracket extension 126 formed as part of the bracket 68. The pawl 122 extends on the opposite side of the pivot pin 124 from the point of the pawl and engages as a link a pin 128 fastened in an extension of the armature core 130 of a solenoid 132.

Also pivoted on pin 124 is a hooked pawl 136, the hook of which is positioned to engage ratchet tooth 121 also formed on the flange 63 of the inner shell 57. Such engagement of pawl 136 with ratchet tooth 121 occurs after the pawl 122 has been disengaged from tooth 120, the shell 57 rotating as above described in a clockwise direction in Fig. 2 under the bias of springs 16 and 38. The pawl 136 extends on the opposite side of the pivot pin 124 from the hook and engages as a link a pin 138 fastened in an extension of the core 140 of a solenoid 142.

By means of a torsion spring 150 wound about a stud 152 fastened in the bracket extension 126, the ends 153 and 154 of this spring engaging respectively the pins 128 and 138, the pawls 122 and 136 are biased to positions out of engagement with the ratchet teeth 120 and 121. The spring 150 effects this disengagement of the pawls 122 and 136 and release of the shell 57 in two steps respectively when the solenoids 132 and 142 are deenergized.

Such deenergization may be effected upon the occurrence of a selected condition. For example, the solenoid 132 may be deenergized when said solenoid is connected in a circuit which includes a switch under control of an auto-stop register, such as is used in registering the dispensing of gasoline, said switch being actuated when the auto-stop register returns to a predetermined position, for example, when all but 10 units of registration have been completed. The solenoid 142 may be connected in a similar circuit with a switch actuated by said auto-stop register when said register returns to zero. Under such conditions the solenoid 132 when deenergized will effect release of the shell 57 which will then rotate until the tooth 121 is engaged by the hook of the pawl 136 which arrests the rotational movement of said shell and, therefore, the closing movement of the valve. Deenergization of the solenoid 142 releases the hook 136 from the ratchet tooth 121 to permit the shell 57 again to rotate under the bias of the valve spring 16.

The angle through which the shell 57 rotates after release from pawl 122, that is, from the position to which the shell is initially moved to the position with the ratchet tooth 121 in engagement with the hook of the pawl 136, may be such as to exactly correspond with closing movement of the main valve 11 in Fig. 1, the lugs 39 remaining in contact with the end of the hub 14 and maintaining the valve 25 open. This angle, if desired, however, may be such as will hold the valve 11 partially open or, on the other hand, it may be such that the valve 25 is moved part way toward its closed position 16. In any case the subsequent release of the shell 57 by disengagement of the hook of the pawl 136 from the ratchet tooth 121 permits further rotational movement of the shell 57 and full closing movement of the valve 25 to stop flow of the fluid through the valve.

The rotational movement of the shell 57 which brings the tooth 121 into engagement with the hook of the pawl 136 may be represented by the movement of the member M from the position in Fig. 4 to the position in Fig. 5 showing the relative positions of the member M and body B corresponding to the partially open position of the valve, the circle 106—108 having moved part way up in both grooves 100 and 110. Further movement of the shell 57 after release of the tooth 121 from the pawl 136, may be represented by further movement of the member M in the direction of the arrow in Fig. 5 to the position shown in Fig. 3, the circle 106—108 moving further upwardly in both grooves. It thus will be apparent that the shells 57 and 59 have been returned to the position from which in the above description they were initially moved by hand in setting the shell 57 to engage the pawl 122.

It will also be clear that the outer shell 59, after the valve has returned to the fully closed position, will still be held by the detent 75, that is, in the position which is 60° removed from the position of the arm 70 in Fig. 2. By releasing the detent and moving the arm 70 to the position shown in Fig. 2, both shells 57 and 59 again will be rotated as above described and the pawls 122 and 136, if the solenoid 132 and 142 are energized, will be cammed against the pull of these solenoids in passing the ratchet teeth 120 and 121 until pawl 122 engages ratchet tooth 120 to hold the valve open.

Figure 6:
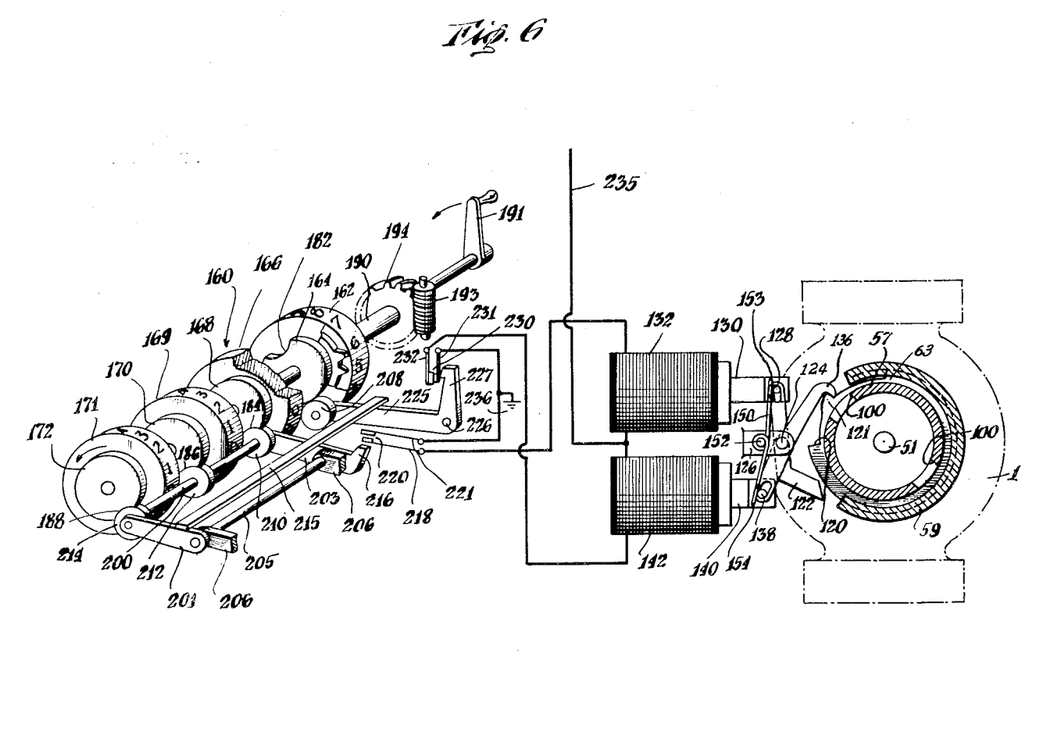
Fig. 6 is a diagrammatic showing of the valve of the invention connected to an auto-stop register.

In Fig. 6 is shown apparatus for operation of a valve constructed as above described under control of an auto-stop register. The valve has associated therewith solenoids 132 and 142 for operation thereof in the manner heretofore described. The auto-stop register 160 comprises units wheel 162 having disc 164 attached thereto, tens wheel 166 having disc 168 attached thereto and wheels of higher order 169 and 171 having discs 170 and 172 respectively attached thereto. The discs attached to each wheel respectively are provided with notches or recesses 182, 184, 186 and 188 in the periphery thereof. Said numeral wheels and discs are mounted on shaft 190 which may be rotated by hand, by means of crank 191, in presetting operation thereof and may be driven during integrating operation thereof by the worm 193 and worm gear 194, the worm being connected through suitable driving connections to the operating element of a meter which measures the fluid flowing therethrough.

Mounted on rod 200 held in frame members 201 and 203 which are connected also by rod 205 supported in bearings 206 are rollers 210, 212, 214 respectively associated with the discs 168, 170, 172. The frame members 201, 203 together with rods 200, 205 form a rigid frame which is arranged for pivotal movement in the bearings 206 so that the rollers 210, 212, 214 are moved outwardly simultaneously upon setting rotation of one or more of the numeral wheels 166, 169, 171 under the camming action of their respective discs 168, 170, 172. It will be apparent that all of the rollers 210, 212, 214 may enter their respective notches 184, 186, 188 when said notches are all in line, the arrangement being such that this occurs when all of the numeral wheels respectively associated with the discs 168, 170, 172 indicate a zero reading. When upon setting the register by turning crank 191 or otherwise the numeral wheel 166, or this wheel together with one or more wheels of higher order, is rotated to a predetermined setting, the frame 201, 203 is pivoted downwardly and the projection 216 of frame member 203 is moved upwardly into contact with the switch arm 218 to close the contacts 220, one of these contacts being held on the fixed switch member 221.

When the units wheel alone is set to a predetermined registration, the roller 208 only is cammed out of notch 182 to a position such as is shown in Fig. 6, this roller 208 being supported on bell crank lever 225 pivotally supported at 226 and having upwardly extending arm 227. When the roller 208 is cammed out of notch 182, the arm 227 closes contacts 230 by moving the movable switch member 231 into contact with the fixed member 232. Upon return of the notch 182 to the zero position, the roller 208 enters said notch and the bell crank lever 225 pivots clockwise about the pivot support 226 to effect opening of the contacts 230.

In order to prevent opening of the contacts 230 when the notch 182 in the integrating operation passes zero upon the completion of each 10 units, with a corresponding indexing of the tens wheel 166, a bar 215 is fastened to frame members 201 and 203 and extends over the bell crank arm 225. It will be apparent that if frame 201, 203 is pivoted in a counter-clockwise direction by rotation of one or more of the numeral wheels 166, 169, 171 and their respective discs 168, 170, 172, the bar 215 will move therewith and will hold the lever 225 down to prevent clockwise movement about the pivot 226 of said bell crank lever 225, thus maintaining arm 227 pressing on switch member 231 to hold contacts 230 in engagement.

The contacts 220 are connected in series with solenoid 132 between a source of supply 235 and the ground at 236. The contacts 230 are connected in series with the solenoid 142 between the supply 235 and the ground at 236, these contacts 230 and solenoid 142 being in parallel with contacts 220 and solenoid 132. Upon return of the tens wheel and all numeral wheels of higher order to zero position, the rollers 210, 212, 214 may enter their respective notches 184, 186, 188 and the switch 220 may be opened, thereby deenergizing the solenoid 132. Such deenergization of this solenoid as above described in connection with Fig. 2 will effect release of the ratchet tooth 120 from the pawl 122, the parts in Fig. 6 carrying the same numerals as in Fig. 2. The valve stem 51, therefore, may be moved to effect partial closure of the valve, the tooth 121 then coming into engagement with the hook of the pawl 136. When the notch 182 is brought into engagement with the roller 208 upon return of the units wheel to zero, the bell crank lever 225 and the upward extension thereof 227 are pivotally moved in a clockwise direction and the contacts 230 are opened. This effects deenergization of the solenoid 142 to effect release of the ratchet tooth 121 from pawl 136 with concomitant full closure of the valve in the manner above described.

When both solenoids are thus deenergized, the spring 150 thus maintaining the pawls 122 and 136 out of engagement with the ratchet teeth 120, 121, movement of the handle 70 of the valve to the position shown in Fig. 2 and subsequent movement thereof through the angle of 60° to bring the detent 75 into engagement with the socket 84 is ineffective to open the valve for the reason that the inner shell 57 cannot be held in the position to which it is rotated because the pawl 122 cannot engage the ratchet tooth 120. It will be apparent that the auto-stop register thus connected to operate the valve, therefore, is effective upon its return to zero position to prevent opening of the valve and to prevent setting of the valve to the open position because such setting of the valve cannot take place until the auto-stop register has been preset to a predetermined setting to effect energization of the solenoids. The valve, nevertheless, always will be closed immediately upon return of the auto-stop register to zero so that the flow of the fluid may be cut off precisely upon completion of the last unit registered by the auto-stop register.

Within the scope of the invention the pawls 122 and 136 may be operated by other electrical or mechanical means in place of the solenoids 132 and 142. Such means are disclosed in my copending application Serial No. 584,969, filed March 26, 1945. Also within the scope of the invention a single pawl, which may be represented by the pawl 122, may be used engaging a single tooth such as tooth 120 on the flange of the shell 57 so that full closure of the valve is secured in one movement instead of in two steps as described in connection with the embodiment illustrated in the drawings. The invention, moreover, is not limited to the particular embodiment illustrated but includes devices which secure closing movement of the valve by the operation of cam surfaces respectively carried by two parts, a member and a body, represented in the illustrated embodiment by the shells 57 and 59, arranged so that when moved relative to each other their camming action upon a cam follower produces a movement of translation of the cam follower as it moves along the cam surfaces. The movement of translation of the cam follower is utilized to effect opening movement of the valve. This movement of translation, moreover, may be transmitted to the valve to effect opening and closing thereof through any suitable mechanism, including those which will produce rotation of the valve stem in a valve designed for such rotational movement to accomplish the opening and closing of the valve.

I claim:

1. The combination with an auto-stop register having a units wheel and a wheel registering multiples of units, and a valve biased to closed position, of means for holding said valve in open position against its bias, means actuated by said wheel registering multiples of units for releasing said valve from said holding means to effect closing movement thereof under its bias, means for intercepting said valve in its closing movement to hold said valve partially open, means actuated by said wheel registering units for effecting release of said valve to move under its bias to the fully closed position, and means effective when said valve is thus released in closed position to prevent opening of said valve.

2. The combination with an auto-stop register having a units wheel and a wheel registering multiples of units, and a valve biased to closed position, of means for holding said valve in open position against its bias, a switch actuated by said units wheel and a switch actuated by said wheel registering multiple units, a solenoid for each switch energized and deenergized under control of its switch, means operatively connecting said solenoids with said valve holding means to hold said valve partially open when only said switch actuated by said units wheel effects energization of said solenoid connected thereto and to hold said valve in fully open position when said switch actuated by said multiples wheel effects energization of said solenoid connected thereto.

3. The combination according to claim 1 which comprise means effective when both said solenoids are deenergized for preventing said valve holding means from holding said valve open.

4. The combination with a valve biased to closed position, and a presettable register, of means controlled by said register for restraining said valve in open position against its bias when said register is in a position of setting other than zero and for releasing said valve to move to closed position under its bias when said register is at zero, means operable when said restraining means is controlled by said register in said position of setting other than zero for moving said valve to open position, and means controlled by the register and effective when said register is at zero for preventing said valve moving means from moving said valve to open position.

5. The combination with a valve biased to closed position, and a presettable register having a units wheel and a numeral wheel of higher order, of means controlled by said wheel of higher order for restraining said valve in open position against its bias when said wheel of higher order is in a position of setting other than zero and for releasing said valve to move toward closed position under its bias upon return of said numeral wheel of higher order to its zero position, means controlled by said units wheel for restraining said valve in partially open position against its bias when said units wheel is in a position of setting other than zero and for releasing said valve to move to closed position under its bias upon return of said units wheel to zero position, means effective when at least said restraining means controlled by said units wheel is controlled thereby in a position of setting of said wheel other than zero for moving said valve to open position, and means effective when all said wheels of said register are at zero for preventing said valve moving means from moving said valve to open position.

6. The combination with a valve biased to closed position and a presettable register having a units wheel and a numeral wheel of higher order, of means controlled by said wheel of higher order when said wheel of higher order is in a position of setting other than zero for conditioning said valve for opening and closing movements thereof between closed position and fully open position, means controlled by said units wheel when said units wheel is in a position of setting other than zero for conditioning said valve for opening and closing movements thereof between closed position and a partially open position, manually operable means effective when said valve respectively is conditioned by the settings of said wheels for producing the opening and closing movements of said valve corresponding to said settings, said means controlled by said wheels being effective when both of said wheels are in the zero position to prevent said manually operable means from opening said valve.

7. In combination with a valve biased to closed position and a presettable register having a units wheel and a numeral wheel of higher order, electrically actuated means associated with each of said wheels and controlled respectively thereby for conditioning said valve for opening and closing movements thereof, said electrically actuated means controlled by said wheel of higher order being effective to condition said valve for full opening movement thereof, said electrically actuated means controlled by said units wheel being effective to condition said valve for partial opening movement thereof, and manually operable means operatively connectible to said valve for effecting full and partial opening and closing movements thereof respectively when said valve is conditioned by settings of said wheel of higher order and said units wheel to positions other than zero.

8. In combination with a valve biased to closed position and a presettable register having a units wheel and a numeral wheel of higher order, electrically actuated means associated with each of said wheels and controlled respectively thereby for conditioning said valve for opening and closing movements thereof, said electrically actuated means controlled by said wheel of higher order being effective to condition said valve for full opening movement thereof, said electrically actuated means controlled by said units wheel being effective to condition said valve for partial opening movement thereof, and manually operable means operatively connectible to said valve to effect opening and closing movements thereof when at least one of said electrically actuated means is controlled to condition said valve for opening and closing movements thereof, said manually operable means being prevented from such operative connection to said valve when neither of said electrically actuated means is controlled so as to condition said valve for opening and closing movements thereof.

9. The combination with a valve biased to closed position, and a presettable register, of manually operable means, an element actuated to a given position by said register when said register is in a position of setting other than zero and actuated by said register to an initial position when said register is in the zero position, and means operatively connected to said element when said element is in said given position and when so connected cooperating with said element to provide an operative connection between said manually operable member and said valve for effecting opening and closing movement of said valve upon operation of said manually operable member, said element in said initial position being disconnected from said connection means to disestablish the operative connection between said manually operable member and said valve so as to prevent operation of said valve when said register is in the zero position.

10. The combination with a valve biased to closed position, a register having a normal position and movable therefrom to at least one active position, and a valve operating device, of a releasable mechanical connection between the valve and the operating device, said connection including a lockable member and being effective when said member is locked to operatively connect the valve and the operating device so that the operating device can open the valve and effective when said member is free to operatively disconnect the valve and the operating device so that the operating device is prevented from opening the valve, a locking member movable between a locking position wherein it locks said lockable member and an unlocking position wherein said locking member is free to move, and means controlled by the register for moving said locking member, said register-controlled means being effective when the register is away from its normal position to move said locking member to its locking position so that the valve may then be operated by the operating device, and when the register is in its normal position to move said locking member to its unlocking position so that the opening of the valve by the operating device is then prevented.

CHARLES S. HAZARD.

REFERENCES CITED

The following references are of record in the file of this patent:

UNITED STATES PATENTS

| Number | Name | Date |
|---|---|---|
| 305,595 | Hughes | Sept. 23, 1884 |
| 397,260 | Wellens | Feb. 5, 1889 |
| 993,072 | Jones | May 23, 1911 |
| 1,001,409 | Jennings | Aug. 22, 1911 |
| 1,996,944 | Witter | Apr. 9, 1935 |
| 2,228,820 | Griffith et al. | Jan. 14, 1941 |
| 2,265,325 | Steen | Dec. 9, 1941 |
| 2,289,867 | Berck | July 14, 1942 |
| 2,358,712 | Hinds | Sept. 19, 1944 |

Certificate of Correction

Patent No. 2,508,064                                          May 16, 1950

CHARLES S. HAZARD

It is hereby certified that errors appear in the printed specification of the above numbered patent requiring correction as follows:

Column 5, line 17, for "ito" read *into*; column 11, line 43, for the claim reference numeral "1" read *2*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*